US011988189B2

(12) United States Patent
Schlüter et al.

(10) Patent No.: US 11,988,189 B2
(45) Date of Patent: May 21, 2024

(54) FLANGE CONNECTION, WIND TURBINE HAVING SAME, AND METHOD FOR MONITORING SAME

(71) Applicant: Wobben Properties GmbH, Aurich (DE)

(72) Inventors: Rainer Schlüter, Aurich (DE); Wilko Gudewer, Norden (DE); Ihno Coordes, Ihlow (DE); Frank Knoop, Aurich (DE); Nico Gloystein, Westerstede (DE)

(73) Assignee: Wobben Properties GmbH, Aurich (DE)

( * ) Notice: Subject to any disclaimer, the term of this patent is extended or adjusted under 35 U.S.C. 154(b) by 17 days.

(21) Appl. No.: 17/438,797

(22) PCT Filed: Mar. 16, 2020

(86) PCT No.: PCT/EP2020/057043
§ 371 (c)(1),
(2) Date: Sep. 13, 2021

(87) PCT Pub. No.: WO2020/183028
PCT Pub. Date: Sep. 17, 2020

(65) Prior Publication Data
US 2022/0145848 A1 May 12, 2022

(30) Foreign Application Priority Data

Mar. 14, 2019 (DE) ...................... 10 2019 106 580.1

(51) Int. Cl.
*F03D 17/00* (2016.01)
*F03D 1/06* (2006.01)

(52) U.S. Cl.
CPC ........... *F03D 1/0658* (2013.01); *F03D 17/00* (2016.05); *F05B 2260/301* (2013.01); *F05B 2260/80* (2013.01)

(58) Field of Classification Search
CPC .. F05B 2260/301; F03D 1/0658; F03D 17/00; F03D 13/10
See application file for complete search history.

(56) References Cited

U.S. PATENT DOCUMENTS

| 10,774,816 B2 | 9/2020 | Fuglsang-Petersen et al. |
| 2011/0184666 A1* | 7/2011 | Imai .......................... G01L 5/24 702/43 |

(Continued)

FOREIGN PATENT DOCUMENTS

| CN | 108507609 A | * 9/2018 |
| CN | 108507609 A | 9/2018 |

(Continued)

*Primary Examiner* — Sabbir Hasan
*Assistant Examiner* — Arthur Paul Golik
(74) *Attorney, Agent, or Firm* — Seed IP Law Group LLP

(57) ABSTRACT

A flange connection for a wind turbine, in particular a blade flange connection, having—a first flange part, in particular a blade receptacle of a rotor blade hub, a second flange part, in particular a rotor blade flange, and multiple bolts which hold the second component against the first flange part in a connected state, wherein the bolts are each screwed to the first flange part. It is proposed that the at least two bolts are in each case connected to one another by a tension means, a sensor arrangement, which detects a change in a tensile force transmitted by the tension means, being actively connected to the tension means. A wind turbine and a method for monitoring the flange connection of the wind turbine are also proposed.

17 Claims, 9 Drawing Sheets

(56) References Cited

U.S. PATENT DOCUMENTS

2017/0022978 A1* 1/2017 Li .......................... F03D 17/00
2020/0025167 A1   1/2020 Nielsen

FOREIGN PATENT DOCUMENTS

| | | | |
|---|---|---|---|
| CN | 114483476 A * | 5/2022 | |
| DE | 102013218845 A1 | 3/2015 | |
| DE | 102015212906 A1 * | 1/2017 | ........... F03D 1/0658 |
| DE | 102015212906 A1 | 1/2017 | |
| DE | 102019106580 A1 | 9/2020 | |
| EP | 3032093 A1 * | 6/2016 | ........... F03D 1/0658 |
| EP | 3032093 A1 | 6/2016 | |
| EP | 3467303 A1 | 4/2019 | |
| EP | 3502629 A1 * | 6/2019 | |
| WO | 2018145783 A1 | 8/2018 | |
| WO | WO-2021121410 A1 * | 6/2021 | |

* cited by examiner

FLANGE CONNECTION, WIND TURBINE HAVING SAME, AND METHOD FOR MONITORING SAME

BACKGROUND

Technical Field

The invention relates to a flange connection, in particular of a rotating component connection of a wind turbine, in particular a blade flange connection, having a first flange part, in particular a blade receiver of a hub, a second flange part, in particular a rotor blade flange, a plurality of bolts that, in a connected state, hold the second flange part against the first flange part, wherein the bolts are each threadedly connected to the first flange part, and to a wind turbine. The invention furthermore relates to a method for monitoring a flange connection.

Description of the Related Art

A flange connection of the type stated at the outset is known, for example, from a wind turbine. The wind turbine has a tower, a nacelle, a generator, and a hub that is connected to the generator. The hub is connected to a plurality of rotor blades, each rotor blade being connected to the hub by means of a flange connection.

In the case of such flange connections, it can happen that a part of the bolt becomes detached as a result of breaking off. The detached part of the bolt can cause damage or, in the case of a wind turbine, endanger people by falling from a great height. Against this background, it is desirable to avoid such unwanted detachment, and to render possible a method for monitoring the flange connection for such unwanted detachment.

In the priority-granting German application DE 10 2019 106 580.1, the following documents were searched by the German Patent and Trade Mark Office as prior art: DE 10 2015 212 906 A1, EP 3 467 303 A1.

BRIEF SUMMARY

Provided is a flange connection, or a method for monitoring a flange connection, that enables a wind turbine having such a flange connection to be operated safely.

Provided is a flange connection of the type designated at the outset, in that the bolts are in each case operatively connected to one another by a tension means. In the event a part of one of the bolts breaks off, it can detach from the connection receiver but still remains on the tension means, and thus in the region of the flange connection.

Operatively connected to the connection means, in particular, is a sensor arrangement that is configured to detect the force acting upon the tension means, or especially a change in the tensile force transmitted by the tension means. A change in the tensile force can result, in particular, from the breaking-off of a part of one of the bolts. The unwanted detachment of at least a part of the bolts can thus be sensed and signaled as a fault of the flange connection. In this case, the tensile force transmitted by the tension means may initially be equal to or greater than zero. The detachment of a part of one of the bolts inevitably results in in a change in the tensile force, either as a result of a loss of pretension or an increase in tensile force due to the mass inertia of the detaching part, which can be detected by the sensor arrangement.

The bolts preferably have an intermediate connector, for example a cover element or a retaining plate, which is fastened to the bolt in each case and to which the tension means in each case is operatively connected. By means of the intermediate connector, existing flange connections can also be retrofitted. The intermediate connector is preferably fixedly connected to the free end of the bolt.

In a preferred embodiment, the sensor arrangement may be realized as a plug-and-socket connection that conductively connects two signal lines to one another. One of the signal lines, as well as, for example, the plug-and-socket connection itself, may be realized as part of a safety switch. The change in the tensile force transmitted by the tension means can cause the plug-and-socket connection to open. For this purpose, it is provided that the tension means does not transmit any tensile force as long as an unwanted detachment of a part of one of the pins has not occurred. Detachment of a part of at least one of the bolts tensions the tension means, causing the plug-and-socket connection to open. The interruption of the conductive connection of the two signal lines can be sensed and signaled as a fault of the flange connection. The tensile stress is generated by centripetal or centrifugal forces during rotational movement of the flange connection.

For this purpose, the signal lines may be fixedly connected to the tension means at two mutually spaced-apart fastening points along the latter, wherein, starting from the respective fastening point there is provided a signal-line portion, on each of which a connector element of the plug-and-socket connection is arranged at the end.

Preferably, the fastening points may be arranged between two bolts on the tension means. By avoiding the overtensioning of a bolt by the two signal line sections, a functional impairment of the sensor arrangement can be prevented.

In order for the plug-and-socket connection to open upon an increase in the tensile force transmitted by the tension means, it is provided that the two signal line portions connected by the connector elements have a shorter length than a portion of the tension means between the two fastening points. As long as there is no unwanted detachment, the portion of tension means will sag between the attachment points. If a part of one of the connection means detaches from the connection receiver, it will hang on the tension means, causing tensioning in the tension means due to the additional weight force. The tension means therefore transmits a tensile force greater than zero, such that the fastening points on the tension means are moved in opposite directions. This results in the opening of the plug-and-socket connection.

Alternatively, the sensor arrangement may be configured to apply a pretension to the tension means. Such a sensor arrangement makes it possible to monitor the tension means itself in addition to the occurrence of a fault due to the detachment of a part of at least one of the composite parts. In addition in this case, the pretension applied to the tension means is monitored by the sensor arrangement. If an interruption occurs in the tension means itself, for example due to breaking of the tension means, the tensile force transmitted by the tension means drops to the value zero. The drop in the value of the tensile force transmitted by the tension means can be signaled by the sensor arrangement as a corresponding fault. In the case of this design, the tension means constitutes the measuring transducer of the sensor arrangement.

Preferably, the sensor arrangement may comprise a switching element that is connected to the tension means and that can be actuated upon a change in the tensile force transmitted by the tension means. In particular, the switching element has at least two switching positions. Particularly preferably, the switching element has three switching positions. The sensor arrangement is preferably configured to signal in the first switching position of the switching element that there is no fault, and to signal in the second switching position of the switching element that there is a fault caused by the detachment of a part of at least one bolt, and preferably to signal in the third switching position of the switching element that there is a fault in the form of the interruption of the tension means.

In particular, for the purpose of applying the pretension to the tension means, there may be a spring means arranged between the tension means and the switching element. The spring means, in particular a tension spring, connects the tension means to the switching element in such a manner that a tensile force corresponding to the spring force is initially transmitted through the tension means. The spring force caused by the spring means in this case is less than the weight force of at least the intermediate connector. Thus, an interruption of the tension means results in the switching element being switched to its third switching position due to the loss of force by the spring means. If there is no interruption of the tension means and no detachment of a part of at least one bolt, the switching element is in its first switching position. Detachment of a part, with the intermediate connector attached to it, causes the tensile force transmitted by the tension means to increase. This results in the switching element being switched to its second switching position against the spring force. Particularly preferably, the switching element may be realized as a toggle switch.

A captive arrangement of the intermediate connector can be achieved in that the intermediate connector is connected to the free end of the bolt in a force-fitting, form-fitting and/or materially bonded manner. For example, the intermediate connector may be screwed onto the free end of the bolt. An adhesive connection to the bolt is also conceivable. Preferably, the intermediate connector may be made of a plastic.

The intermediate connector in this case may be configured to receive the tension means transversely in relation to the longitudinal axis of the bolt. According to one embodiment, the intermediate connector may have a tension-means receiver in an end region, for example a through-hole oriented transversely in relation to its longitudinal axis, through which the tension means can be passed. Alternatively, there may be an annular receiver formed on the intermediate connector, through which the tension means can be passed. The through-hole, and the annular shoulder, in this case have an inner diameter that is larger than the outer diameter of the tension means.

According to a preferred further development, a sleeve assigned to the bolt may be connected to the intermediate connector by a loss prevention device. The bolt may extend portionally through the sleeve. The loss prevention device, which connects the sleeve and the intermediate connector to each other, is provided in order to prevent detachment of a part of at least one bolt from also causing the sleeve to detach.

For this purpose, the loss prevention device may be realized in the form of a tube, and can be plugged or slipped over the sleeve and the intermediate connector. The tubular loss prevention device may be secured against slipping off the sleeve and the intermediate connector by fastening means such as, for example, cable ties, hose clips or the like.

Alternatively, the loss prevention device is preferably realized as a plate, in particular as part of the retaining plate.

Furthermore, provided is a wind turbine of the type described at the outset, in that it has a flange connection according to any one of the embodiments described above. By means of the flange connection, an unwanted detachment of a part of a bolt can be prevented, whereby damage to the wind turbine can be avoided and the risk of injury to maintenance personnel and other persons is reduced. Likewise, falling can be prevented by the intermediate connector held on the tension means and the part located thereon. In particular, a fault of the flange connection, caused by the unwanted detachment of a part of a bolt, can be detected and signaled at an early stage in order to prevent potential subsequent damage to the wind turbine.

The above has been described above with reference to the flange connection on the basis of a first aspect. In a further aspect, provided is a method for monitoring a flange connection comprising
 a first flange part,
 a second flange part
 a plurality of bolts holding the second flange part to the first flange part in a connected state, wherein the bolts are each threadedly connected to the first flange part, wherein, for the purpose of monitoring for an unwanted detachment of a part of at least one bolt, the bolts are each connected to one another by a tension means, wherein connected to the tension means is a sensor arrangement that detects a change in a tensile force transmitted by the tension means.

The method makes use of the same advantages and preferred embodiments as the flange connection described above, such that, to avoid repetition, reference is made to the above explanations in this respect. It is particularly advantageously notable that, according to the method, the free ends of all bolts are connected to the tension means by means of the intermediate connector, in particular in a captive manner, such that, in the event of a part of the bolt breaking off, this can detach from the connection receiver and still remain on the tension means, and this can at the same time be used for monitoring for unwanted detachment.

Preferably, the tension means is maintained by the sensor arrangement in a functional state in which at least the bolts are in a functional state. A functional state is understood to mean the situation in which at least no unwanted detachment of a part of at least one bolt has occurred at the flange connection.

Further preferably, a state of at least one bolt or of the tension means deviating from the functional state may be determined by the sensor arrangement on the basis of the change in the tensile force. For this purpose, the sensor arrangement can be used to deduce the functionality of the tension means in its additional capacity as a measuring sensor, i.e., whether the function of the sensor arrangement as such is still present. In addition, the unwanted detachment of a part of at least one bolt can be detected.

The sensor arrangement preferably signals whether a) there is no fault, b) there is a fault caused by the detachment of a part of at least one bolt, and preferably whether c) there is a fault in the form of the interruption of the tension means.

BRIEF DESCRIPTION OF THE SEVERAL VIEWS OF THE DRAWINGS

The invention is described in the following with reference to the appended figures, on the basis of preferred exemplary embodiments. There are shown therein.

DETAILED DESCRIPTION

Figure 1:
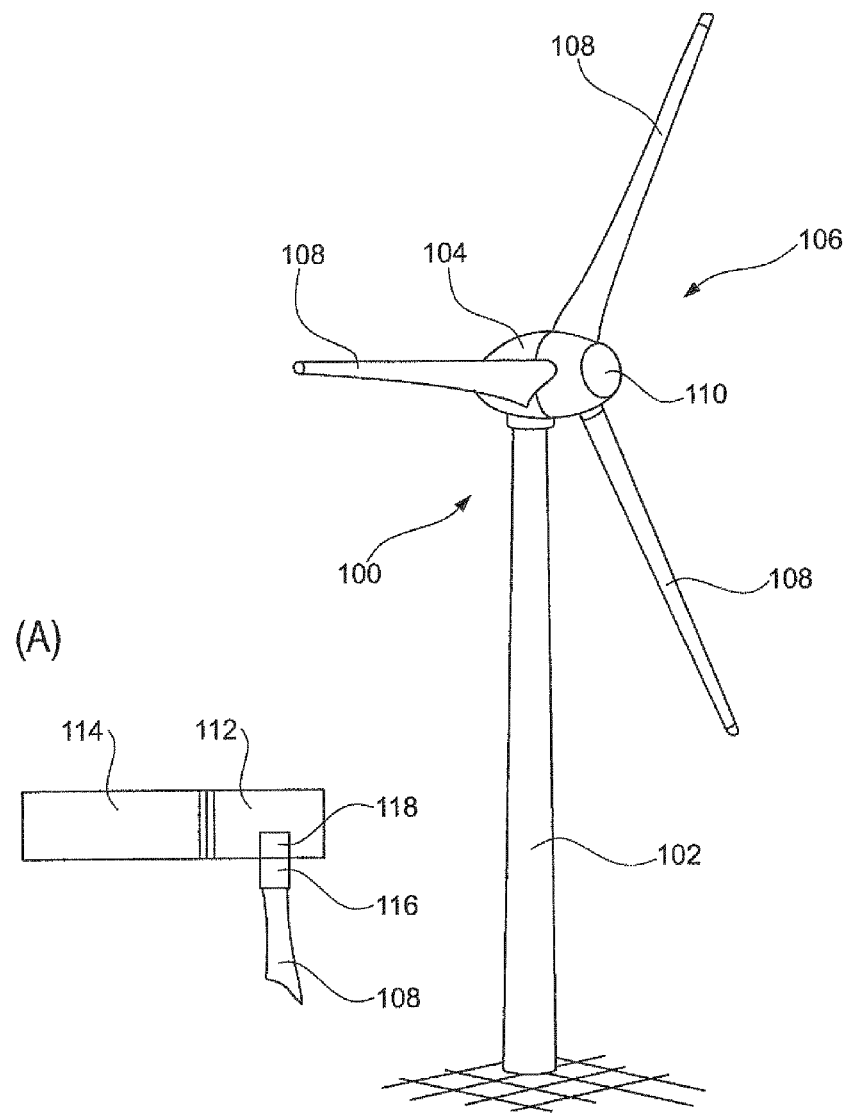
FIG. 1 shows a wind turbine according to a preferred exemplary embodiment.

FIG. 1 shows a wind turbine 100, having a tower 102 and a nacelle 104. Arranged on the nacelle 104 there is a rotor 106 that has three rotor blades 108 and a spinner 110. The rotor blades 108 are attached by a spinner 110 to a hub 112, shown in detail in FIG. 1, which drives a generator 114 to produce electrical power. By way of example, detail (A) of FIG. 1 shows the attachment of a rotor blade 108 to the hub 112. The rotor blade 108 is connected to a hub adapter 118 by means of a blade bearing 116.

Figure 2:
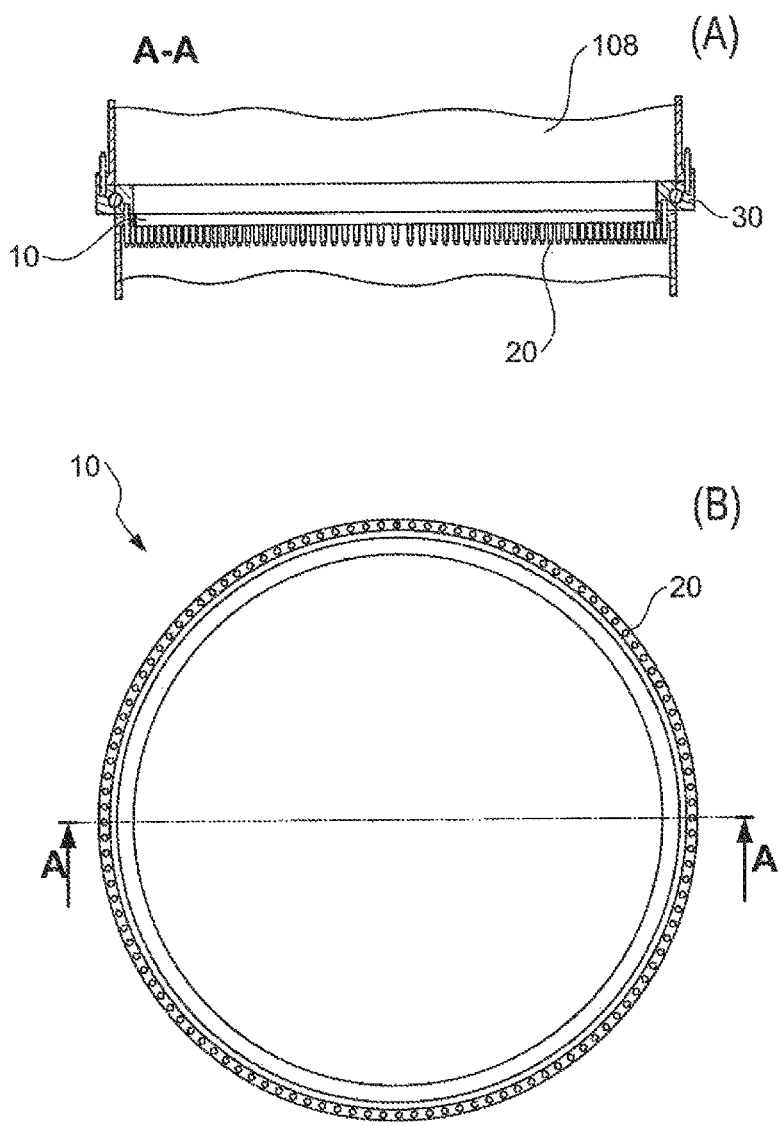
FIG. 2 shows a blade bearing—here, for example, in the case of a wind turbine of FIG. 1—in a top view in view (B), and in a lateral sectional view along the section A-A in view (A)

FIG. 2 in addition shows as an example for a rotor blade 108, in view (A) and view (B), a blade flange 10 forming a retaining part as a first flange part (10) according to the concept. Further, a row of bolts 20, in the form of a plurality of screws or threaded bolts, can be seen on the blade flange 10. The bolts 20 are arranged in a concentric circumferential row along the blade flange 10. The lower end of the blade flange 10 forms a retaining part of a flange joint. The bolts 20 are in the form of threaded bolts that hold the blade flange 10 against a blade-flange bearing 30, which acts as a second flange part (30) forming a receiving part.

Figure 3:
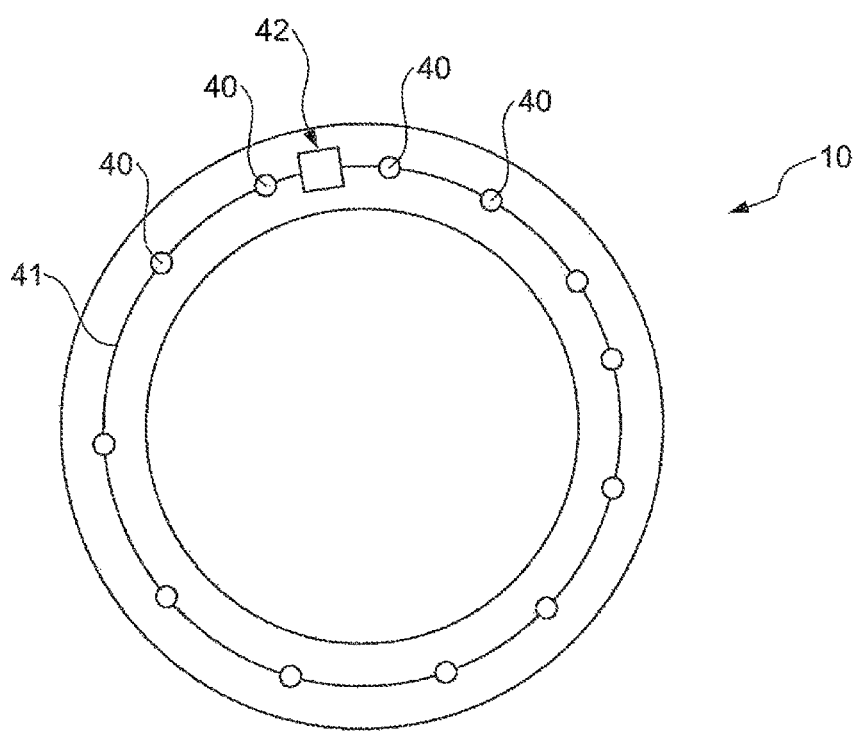
FIG. 3 shows a schematic top view of a blade flange forming a first component.

FIG. 3 shows a schematic top view of the blade flange 10 forming a first component. An intermediate connector 40, in the form of a cover element, is arranged at each of the free ends of the bolts 20 (cf. FIG. 2). The intermediate connector 40 is preferably arranged in a captive manner, in that the intermediate connector 40 is realized with an internal thread. The metal plate version does not have a thread, here captive security is achieved by clamping and possibly additional gluing. The intermediate connector 40 may be screwed onto the respective bolt 20 (cf. FIG. 2) after connecting the blade flange 10 to the blade-flange bearing 30 (cf. FIG. 2). The cover elements (which in the illustrated embodiment are the intermediate connectors 40) are connected to each other by a rope-shaped tension means 41. In particular, the tension means 41 is realized as a wire rope. The ends of the tension means 41 are connected to each other by a sensor arrangement 42. The sensor arrangement 42 serves to monitor for an unwanted detachment of a part of at least one of the bolts 20 (cf. FIG. 2) of the flange connection. For this purpose, the sensor arrangement 42 detects changes in a tensile force $F_{tensile}$ transmitted by the tension means 41, as explained in more detail below.

Figure 4:
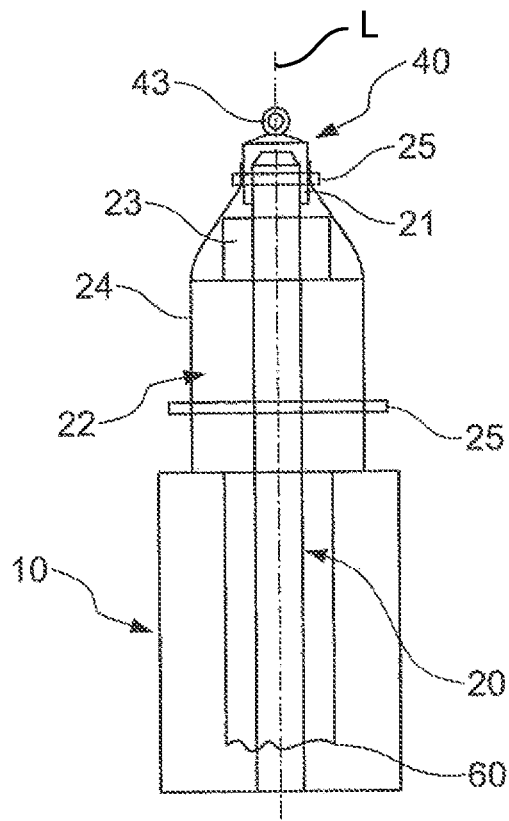
FIG. 4 shows a schematic representation of the bolt 20 with a cover element arranged thereon.

FIG. 4 shows a schematic representation of the bolt 20 with an intermediate connector 40 arranged thereon. The hollow-cylinder intermediate connector 40 is preferably made of a plastic, and is screwed onto a threaded portion 21 of the bolt 20. Placed on the bolt 20 there is a sleeve 22, which is supported at the end on the blade flange 10. The sleeve 22 is fixed in the axial direction by a nut 23. Furthermore, a tubular loss prevention device 24, for example a pull tube, may be slipped, or turned, over the intermediate connector 40 and the sleeve 22. The loss prevention device 24 may be secured against slipping by fastening means 25 (fasteners) such as, for example, cable ties, hose clips or the like.

The intermediate connector 40 has, at the end, an annular receiver 43 through which the tension means 41 is passed. The annular receiver 43 may be integrally formed onto the intermediate connector 40 in the course of its manufacturing process. Reference 60 denotes a crack in the bolt 20, which causes the part of the bolt 20 above the crack 60 to be able to detach from a connection receiver of the blade-flange bearing 30 (cf. FIG. 3).

Figure 5:
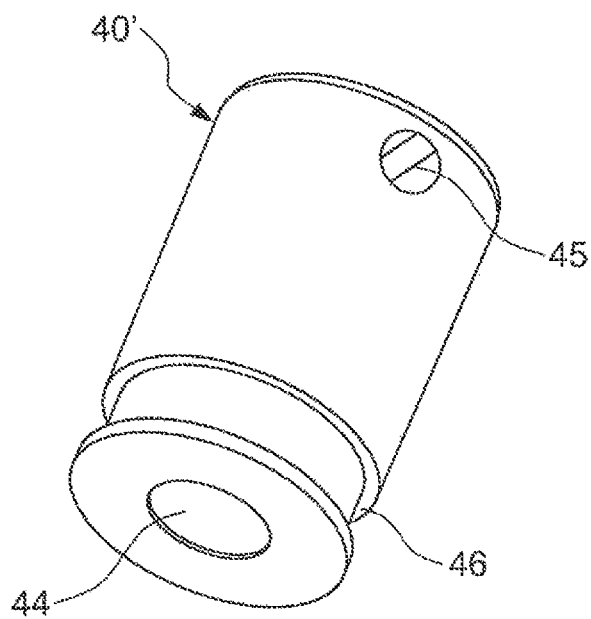
FIG. 5 shows a perspective view of a cover element according to an alternative embodiment.

FIG. 5 shows a perspective view of a cover element (which in the illustrated embodiment is the intermediate connector 40') according to an alternative embodiment. The hollow-cylinder intermediate connector 40' has a threaded hole 44, by means of which the intermediate connector 40' can be fastened on the bolt 20. There is a circumferential fastening groove 46 provided at one end of the intermediate connector 40'. The fastening means 25 (cf. FIG. 4), realized as a cable tie or hose clip, can engage in a form-fitting manner in the fastening groove 46. Realized at the opposite end of the intermediate connector 40' there is a tension-means receiver 45, for example realized as a through-hole transverse to the longitudinal axis L of the bolt. The tension-means receiver 45 serves to pass through the tension means 41 (cf. FIG. 3). The tension-means receiver 45 may be positioned at a distance from the end of the threaded hole 44, such that an axial distance is constituted between the tension-means receiver 45 and the end of the bolt 20 onto which the intermediate connector 40' is screwed. It is also conceivable, however, to provide the free end of the bolt 20 with a through-hole, such that, alternatively or additionally, the tension means 41 (cf. FIG. 3) could be passed through this through-hole at the free end of the bolt 20 (cf. FIG. 3). A combination of both through-holes makes it possible to achieve simplification of the shape of the intermediate connector 40'. In addition, this increases the captive security of both the intermediate connector 40 and the bolt 20 (cf. FIG. 3).

Figure 6:
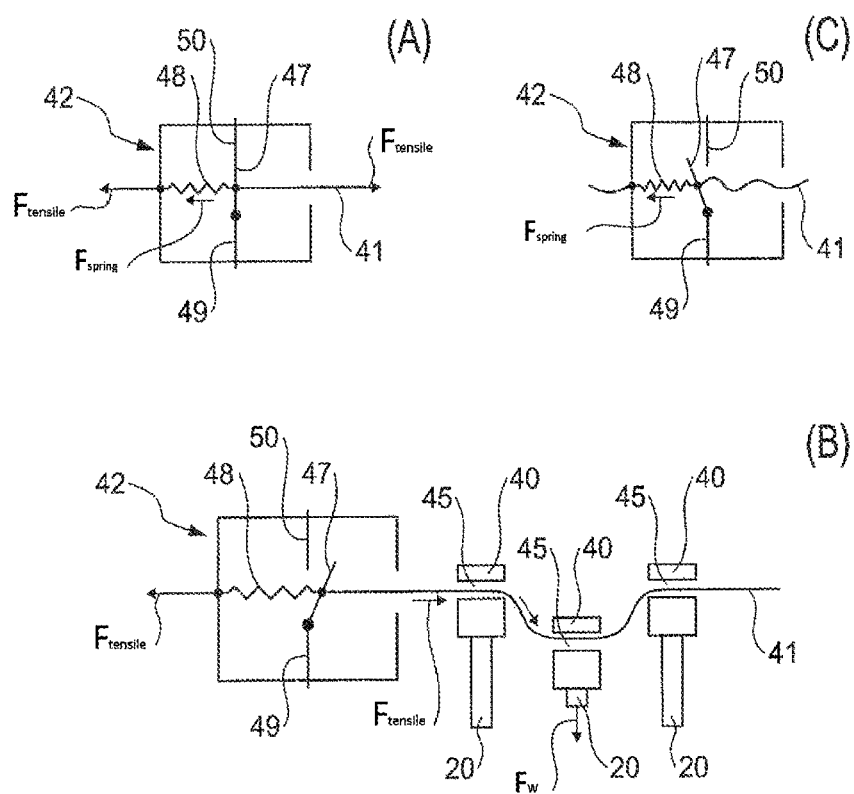
FIG. 6 shows a schematic representation of a sensor arrangement according to a first embodiment, in a first switching position in view A, in a second switching position in view B, and in a third switching position in view C.

FIG. 6 shows a schematic representation of the sensor arrangement 42 according to a first embodiment, in a first switching position in view (A), in a second switching position in view (B), and in a third switching position in view (C). The sensor arrangement 42 comprises a switching element 47, and a spring means (spring) 48 that is arranged on the switching element 47. The spring means 48 is preferably realized as a tension spring. The tension means 41 is connected by one end to the switching element 47 and by the other end to the spring means 48. As a result of the tension means 41 being passed through the tension-means receivers 45 of the cover elements 40, the tension means 41 connects all the connection means (bolts 20), arranged in the concentric circumferential row along the blade flange 10 (cf. FIG. 4), to one another.

Two signal line portions 49, 50 of two signal lines, respectively, can be conductively connected to each other by the switching element 47, depending on the switching position assumed. The spring means 48, because of its spring force $F_{spring}$, applies a constant pretension to the tension means 41 in order to tension the tension means 41, as represented in view (A), such that a tensile force $F_{tensile}$ is transmitted by it. The switching element 47 in this case is in its first switching position, in which the signal line portions 49 and 50 are conductively connected to each other. The sensor arrangement 42 thus signals that the flange connection does not have a fault due to an unwanted detachment of a part of at least one bolt 20. The setting of the first switching position of the switching element 47, in which the tension means 41 and the spring means 48 are in an equilibrium position, is performed when the sensor arrangement is being mounted.

The second switching position of the switching element 47 is represented in view (B) of FIG. 6. In this situation, there has been an unwanted detachment of a part of at least one bolt 20, caused by the crack 60 (cf. FIG. 4). This causes the part of the bolt 20, now hanging on the tensile means 41, to apply an additional weight force $F_w$ to the pretensioned tension means 41, such that the tensile force $F_{tensile}$ transmitted by the tension means 41 is greater than the spring force $F_{spring}$ of the spring means 48. This causes the switching element 47 to be switched to its second switching position, in which the conductive connection of the signal line portions 49 and 50 is interrupted. The interruption is signaled externally as a fault.

The third switching position of the switching element 47 is represented in view (C) of FIG. 6. The third switching position results from an interruption of the tension means 41, for example caused by breaking. As a result of the interruption, the tension means 41 does not transmit any tensile force, such that the switching element 47 is actuated by the spring means 48. The actuation of the switching element 47 results in the interruption of the conductive connection of the signal line portions 49 and 50. The interruption is signaled externally as a fault.

The switching element 47 may be realized, for example, as a toggle switch. The direction of movement of the switching element 47, realized as a toggle switch, during the switchover from the first switching position to the second or third switching position may likewise be detected, such that differentiation in respect of the cause can additionally be provided in the signaling of the fault.

By means of the sensor arrangement 42, with the tension means 41 functioning as a measuring transducer, the unwanted detachment of a part of the bolt 20 is prevented, on the one hand, in that the part remains connected to the tension means 41 by the intermediate connector 40. On the other hand, the unwanted detachment of the part is detected by a change in the tensile force $F_{tensile}$ transmitted by the tension means 41.

Figure 7:
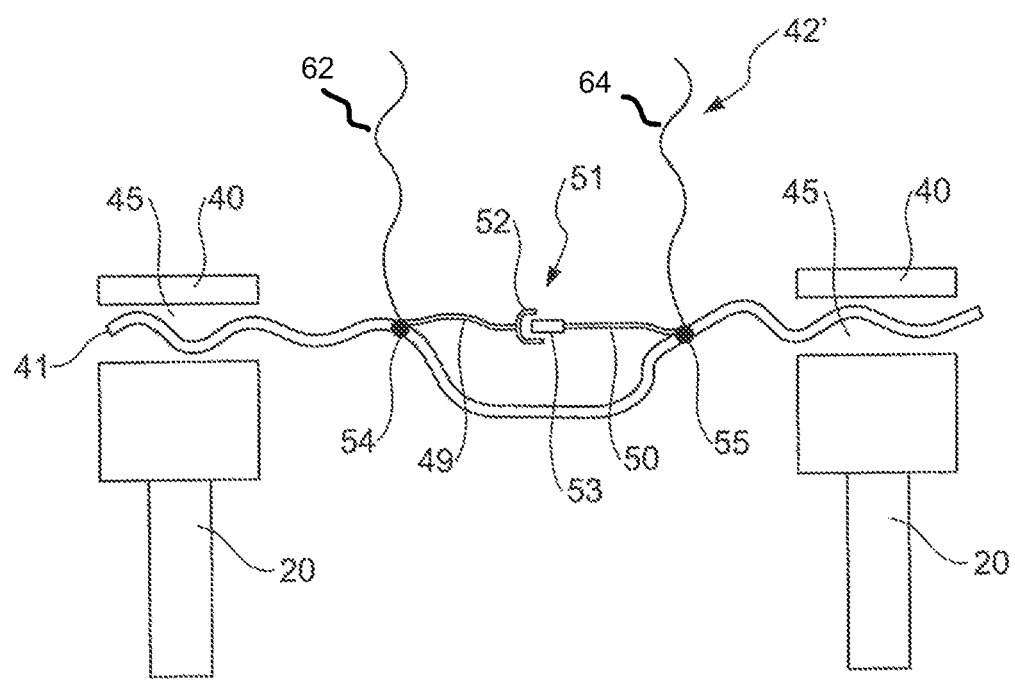
FIG. 7 shows a schematic representation of a sensor arrangement according to a second embodiment, in a first switching position.

FIG. 7 shows a schematic representation of a sensor arrangement 42' according to a second embodiment, in a first switching position. The sensor arrangement 42' comprises a plug-and-socket connection 51 that conductively connects two signal line portions 49, 50 of two signal lines 62 64 to each other by means of connector elements 52, 53. The signal lines 62 64 are fixedly connected to the tension means 41 at two fastening points 54, 55 that are mutually spaced apart along the latter. The respective signal line portion 49, 50, on which the respective connector element 52, 53 of the plug-and-socket connection 51 is arranged at the end, extends out from the respective fastening point 54, 55. As already described above with reference to the first embodiment of the sensor arrangement 42, a change in the tensile force transmitted by the tension means 41 is also detected by the sensor arrangement 42'. The second embodiment of the sensor arrangement 42' differs from this in that no pretension is applied to the tension means 41. The tension means 41 is routed through the tension-means receivers 45 of the intermediate connectors 40. The free ends of the tension means 41 are then connected to each other without tension by a fastener.

The two signal line portions 49, 50 connected by the connector elements 52, 53 have a shorter length than the portion of the tension means 41 between the two fastening points 54, 55, i.e., the tension means 41 sags between the two fastening points 54, 55. The retaining force applied by the plug-and-socket connection 51 is selected such that the conductive connection of the two signal line portions 49, 50 is maintained when the tension means 41 is in a non-tensioned state.

Figure 8:
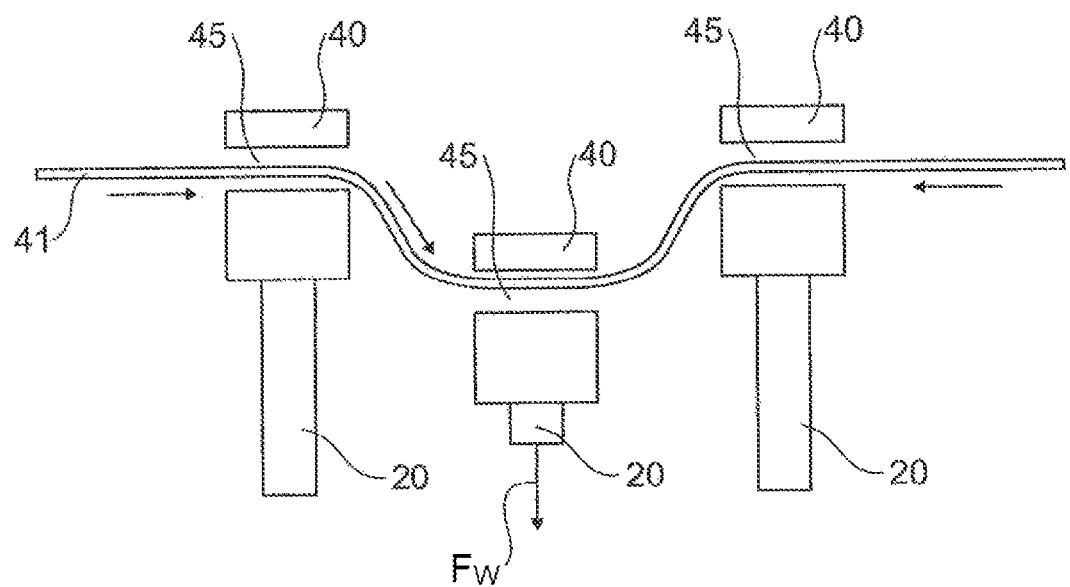
FIG. 8 shows a schematic representation of a plurality of bolts connected to each other by a tension means.

FIG. 8 shows a schematic representation of a plurality of bolts 20 connected to each other by the tension means 41, which are located at a distance from the sensor arrangement 42' (cf. FIG. 7). A part of one of the bolts 20 has become unwantedly detached due to the occurrence of the crack 60 (cf. FIG. 4), and now exerts a weight force $F_w$ upon the pretensioned tension means 41. This results in a tensile force F tensile being transmitted through the tensioned tension means 41, which was untensioned until the time of the unwanted detachment of the part of the bolt. The effect of the transmission of the tensile force $F_{tensile}$ is illustrated in FIG. 9.

Figure 9:
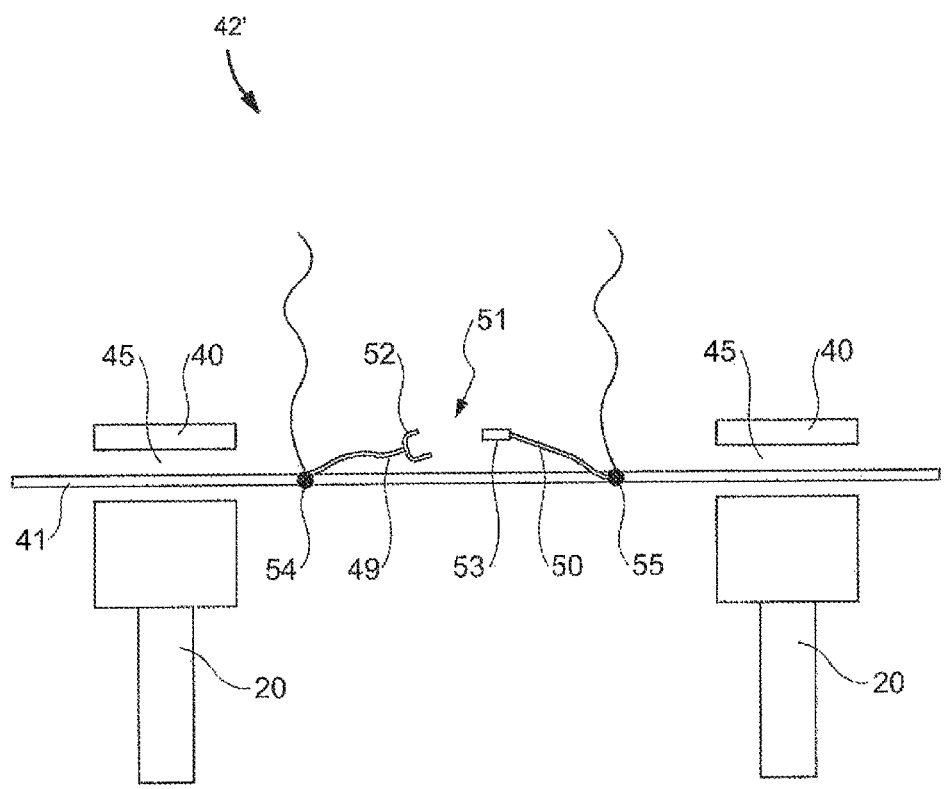
FIG. 9 shows a schematic representation of the sensor arrangement according to FIG. 7, in a second switching position.

FIG. 9 shows a schematic representation of the sensor arrangement 42' according to FIG. 7, in a second switching position. The tensioning of the tension means 41 by the part of the bolt 20 unwantedly detached at any point along the tension means 41 causes the retaining force of the plug-and-socket connection 51 to be exceeded, resulting in the two connector elements 52, 53 being detached from each other. The interruption of the conductive connection of the signal line portions 49, 50 is signaled externally as a fault.

The sensor arrangement 42 according to the first embodiment detects a change in the tensile force $F_{tensile}$ transmitted by the tension means 41 in the form of a decrease in the tensile force $F_{tensile}$. In contrast, the sensor arrangement 42' according to the second embodiment detects a change in the tensile force $F_{tensile}$ transmitted by the tension means 41 in the form of an increase in the tensile force $F_{tensile}$.

Both embodiments have in common that the tension means 41 in conjunction with the intermediate connectors 40, 40' prevent an unwanted detachment of a part of a bolt 20 of the flange connection from causing damage to the wind turbine 100, as it is held in the region of the flange connection by the tension means 41. In addition, the unwanted detachment is detected by the sensor arrangement 42, 42' and signaled externally, so that further damage to the wind turbine 100 can be prevented.

In FIGS. 1 to 9, the tension means 41 is connected to the bolts by means of an intermediate connector 40, 40' in the form of a cover element. However, in other embodiments, the tension means 41 is directly connected to the bolt.

Figure 10:
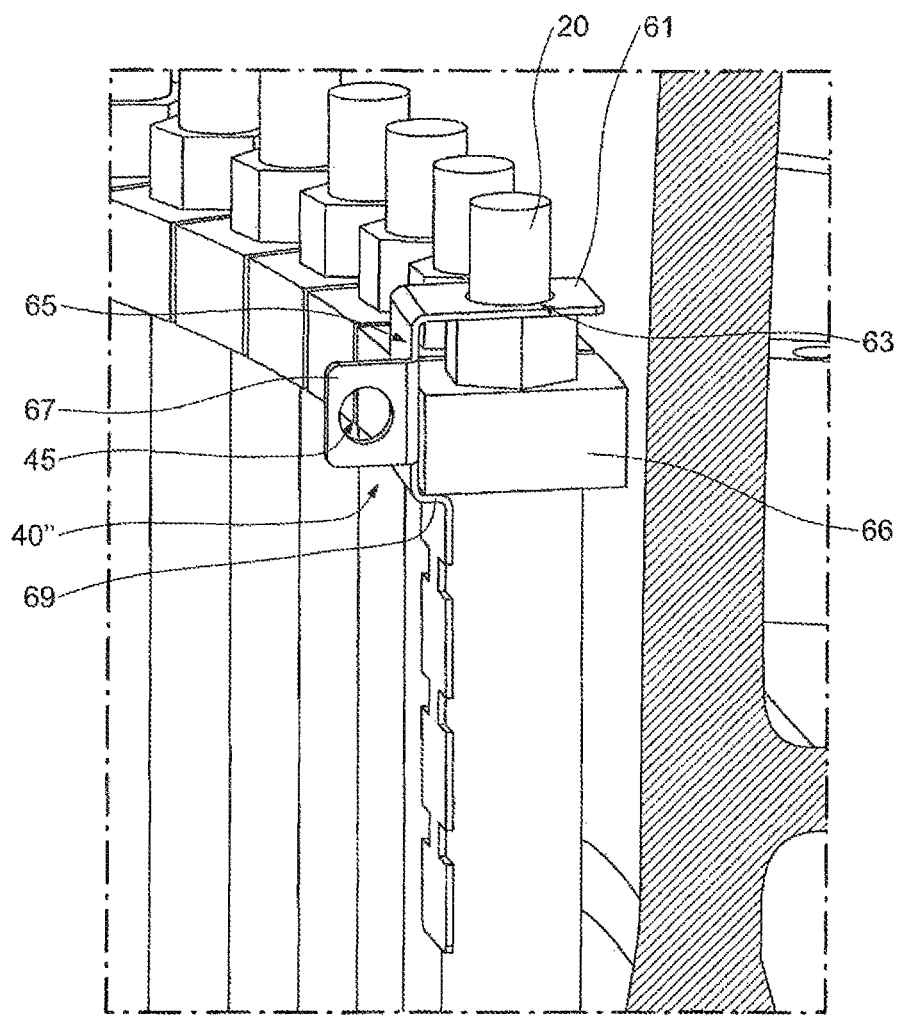
FIG. 10 shows a schematic representation of an alternative intermediate connector for the wind turbine and flange connection of FIGS. 1 to 9.

Represented in FIG. 10 is another preferred alternative of an intermediate connector, denoted by the reference 40". The intermediate connector 40" is realized as a retaining plate, the term "plate" referring to the basic geometric shape of a flat body. In addition to metallic plates in the actual literal sense, suitably shaped and functioning elements made of other materials are also to be understood as "retaining plates," for example plastic bodies, with actual plates being a preferred embodiment due to their strength properties.

The intermediate connector 40″ has the basic shape of a multiply bent plate, or flat body. A bolt receiver 63 is realized, preferably as a through-hole, in a first portion 61. Adjacent to the first portion 61, the intermediate connector 40″ has a second portion 65, which bears against a thrust piece 66 in a tilt-proof manner. The tension-means receiver 45 is realized, in the form of a lug 67, in this case again as a through-hole, on the second portion and 65.

Adjacent to the second portion 65, the intermediate connector has a shoulder 69 that bears as an abutment against the thrust piece 66 of the bolt 20. The shoulder 69 is positioned in such a manner that the intermediate connector can be attached to the bolt 20 by means of latching-in or snap-fitting.

Generally, it is intended to connect the intermediate connector 40,40′,40″ to the bolt in a force-fitting manner (for example by means of screwing), in a form-fitting manner (for example by means of a snap-fit connection) or in a materially bonded manner (for example by means of gluing), or by means of a combination of several or all of these measures, depending on the particular application.

The invention claimed is:

1. A flange connection of a rotating component connection of a wind turbine comprising:
    a first flange part that is a blade receiver of a hub,
    a second flange part that is a rotor blade flange,
    a plurality of bolts that, in a connected state, hold the second flange part against the first flange part, wherein the plurality of bolts are each threadedly connected to the first flange part, and
    a sensor arrangement,
    wherein at least two bolts of the plurality of bolts are operatively connected to one another by a tension means, wherein the sensor arrangement is operatively coupled to the tension means and configured to detect a change in a tensile force transmitted by the tension means,
    wherein the sensor arrangement comprises a plug-and-socket connection that conductively connects two signal lines to one another, and
    wherein the two signal lines are fixedly coupled to the tension means at two mutually spaced-apart fastening points along the tension means, wherein, starting from respective ones of the two mutually spaced-apart fastening points are signal line portions, wherein a connector element of the plug-and-socket connection is arranged at an end of each signal line portion.

2. The flange connection as claimed in claim 1, wherein each of the plurality of bolts has an intermediate connector comprising a cover element fastened to the respective bolt, and wherein the tension means is operatively coupled to the respective cover elements of the at least two bolts.

3. The flange connection as claimed in claim 2, wherein each of the intermediate connectors is connected to a free end of each bolt of the plurality of bolts in a force-fitting, form-fitting, and/or bonded manner.

4. The flange connection as claimed in claim 3, wherein each of the intermediate connectors is configured to receive the tension means transversely with respect to a longitudinal axis of the respective bolt.

5. The flange connection as claimed in claim 2, comprising sleeves around the plurality of bolts, wherein the sleeves are connected to the intermediate connectors by tubes secured by fasteners.

6. The flange connection as claimed in claim 5, wherein the tubes are configured to be slipped over the sleeves and the intermediate connectors, respectively.

7. The flange connection as claimed in claim 1, wherein the two mutually spaced-apart fastening points are arranged between the at least two bolts.

8. The flange connection as claimed in claim 1, wherein the signal line portions connected by the connector elements have a shorter length than a portion of the tension means between the two fastening points.

9. The flange connection as claimed in claim 1, wherein the sensor arrangement is configured to apply a pretension to the tension means.

10. The flange connection as claimed in claim 9, wherein the sensor arrangement monitors a maintenance of the pretension.

11. The flange connection as claimed in claim 9, wherein the sensor arrangement comprises a switch that is coupled to the tension means, wherein the switch is configured to be actuated upon a change in the tensile force transmitted by the tension means.

12. The flange connection as claimed in claim 11, further comprising a spring between the tension means and the switch, wherein the spring is configured to apply the pretension to the tension means.

13. A wind turbine having the flange connection as claimed in claim 1.

14. The wind turbine as claimed in claim 13, wherein the wind turbine has a tower, a nacelle, a generator, and the hub, wherein the hub is connected to the generator, and wherein at least one rotor blade is connected to the hub by the flange connection of claim 1.

15. A method for monitoring a flange connection, the flange connection comprising:
    a first flange part that is a blade receiver of a hub,
    a second flange part that is a rotor-blade flange,
    a plurality of bolts holding the second flange part to the first flange part in a connected state, wherein each of the plurality of bolts is threadedly connected to the first flange part, and
    a sensor arrangement,
    wherein the method comprises monitoring for an unwanted detachment of a part of at least one bolt of the plurality of bolts, wherein at least two bolts of the plurality of bolts are connected to one another by a tension means, wherein the sensor arrangement is connected to the tension means and detects a change in a tensile force transmitted by the tension means,
    wherein the sensor arrangement comprises a plug-and-socket connection forming a conductive connection that conductively connects first and second signal lines to one another,
    wherein the first and second signal lines are fixedly coupled to the tension means at first and second mutually spaced-apart fastening points, respectively, along the tension means, wherein, starting from the first and second mutually spaced-apart fastening points, respectively, are first and second signal line portions, respectively, wherein a first connector element of the plug-and-socket connection is arranged at an end of the first signal line portion, and a second connector element of the plug-and-socket connection is arranged at an end of the second signal line portion, wherein the change in tensile force occurs when the plug-and-socket connection opens and interrupts the conductive connection between the first and second signal lines.

16. The method as claimed in claim 15, wherein the tension means is maintained by the sensor arrangement in an operational state in which at least the plurality of bolts are in a functional state.

17. The method as claimed in claim 15, wherein a state of at least one of the plurality of bolts or of the tension means deviating from the functional state is determined by the sensor arrangement based on the change in the tensile force.

\* \* \* \* \*